United States Patent
Gloodt et al.

(10) Patent No.: US 6,612,726 B1
(45) Date of Patent: Sep. 2, 2003

(54) ILLUMINATED AUTOMOBILE WHEELS

(76) Inventors: Cary Gloodt, 2889 Springmeadow Ct., Indianapolis, IN (US) 46268; James S. Hutchison, 6502 E. Pleasant Run Pkwy., South Dr., Indianapolis, IN (US) 46219

( * ) Notice: Subject to any disclaimer, the term of this patent is extended or adjusted under 35 U.S.C. 154(b) by 0 days.

(21) Appl. No.: 10/071,360

(22) Filed: Feb. 8, 2002

(51) Int. Cl.[7] ............................................... B60Q 1/26
(52) U.S. Cl. ..................... 362/500; 362/183; 362/251; 362/276; 362/398; 362/545; 362/800
(58) Field of Search ................................ 362/183, 231, 362/251, 276, 398, 427, 500, 541, 543, 545, 800, 802; 315/77, 79

(56) References Cited

U.S. PATENT DOCUMENTS

| | | | | |
|---|---|---|---|---|
| 3,789,208 A | * | 1/1974 | Lewis | 362/398 |
| 4,381,537 A | * | 4/1983 | Hinrichs | 362/500 |
| 4,800,469 A | | 1/1989 | Leon | 362/473 |
| 5,016,144 A | * | 5/1991 | DiMaggio | 362/500 |
| 5,357,238 A | * | 10/1994 | Terada | 362/500 |
| 5,392,200 A | * | 2/1995 | Milde | 362/276 |
| 5,530,630 A | | 6/1996 | Williams | 362/500 |
| 5,634,707 A | * | 6/1997 | Bailey, Jr. | 362/500 |
| 5,800,035 A | * | 9/1998 | Aichele | 362/500 |
| 5,800,038 A | | 9/1998 | McCool | 362/475 |
| 5,833,348 A | | 11/1998 | Bailey, Jr. | 362/473 |
| 6,045,244 A | * | 4/2000 | Dixon et al. | 362/500 |
| 6,168,301 B1 | | 1/2001 | Martinez et al. | 362/500 |
| 6,322,237 B1 | | 11/2001 | Lee | 362/500 |
| 6,422,725 B1 | * | 7/2002 | Fong | 362/500 |

* cited by examiner

Primary Examiner—Alan Cariaso
(74) Attorney, Agent, or Firm—Bingham McHale LLP; C. John Brannon; Daniel L. Boots

(57) ABSTRACT

An assembly for providing illumination to an automobile wheel having an at least partially transparent wheel covering. The assembly includes a bracket for securing to the a non-rotating portion of an automobile wheel and a light emitting diode or diode array operationally connected to the bracket. A rechargeable battery is electrically connected to the light emitting diode and the light emitting diode, when energized, shines light through the at least partially transparent wheel covering when the wheel covering is rotating.

32 Claims, 3 Drawing Sheets

ILLUMINATED AUTOMOBILE WHEELS

TECHNICAL FIELD OF THE INVENTION

The present invention relates generally to the field of automotive accessories and, more specifically, to a device for illuminating automobile wheels.

BACKGROUND OF THE INVENTION

Devices for illuminating the wheels of an automobile both add to the aesthetic appeal of the automobile and increase its safety by improving its visibility. While there are numerous examples of wheel lighting devices in the prior art, none of these references show a stationary arrangement of light sources connected to a non-rotating portion of a wheel and connected to a non-rotating power source. For example, U.S. Pat. No. 6,168,301 to Martinez et al. discloses a system for illuminating a wheel on a vehicle, including a contact ring that includes a circular backing ring of an electrically insulating material and a layer of electrically conductive material over the backing ring. The contact ring is flexibly supported from the concave area of the wheel where a contact brush mounted from the stationary structure of the vehicle makes contact with the layer of electrically conductive material on the contact ring. At least one light emitting device is electrically connected to the layer of electrically conductive material on the contact ring, such that the electrical power from the power source reaches the light emitting device through the contact brush and the contact ring.

U.S. Pat. No. 5,530,630 to Williams, Jr., discloses an apparatus for lighting a wheel rotatably mounted on a frame of a vehicle and including a source of current mounted on the frame of the vehicle, a commutator mounted to the wheel for rotation therewith, at least one light bulb connected to the commutator and secured for rotation therewith, and a brush electrically connected to the source of the current and mounted to the frame adjacent the commutator. The brush has a contact portion for contacting the commutator to provide a flow of current through the battery to the commutator so as to power the light bulb.

U.S. Pat. No. 5,833,348 to Bailey, Jr. discloses an electrically generating power source housed in a wheel cover of a rotating wheel for providing power to light emitting diodes contained in a plastic tube mounted around the rim of the wheel for rotation therewith. The electrical generating source is a stepper motor with an eccentric weight mounted on its shaft.

One problem with the prior wheel illumination devices is that they all contain one or more moving parts that are prone to wearing out. For example, the movement of contact brushes against a moving surface is prone to mechanical wear damage, necessitating frequent replacement of the brushes. Another problem with the known wheel illumination devices is that they are not easily added or installed to existing automobile wheel structures. Installation of the known wheel illumination devices requires extensive modification of the existing components of the wheel mounting assembly, and frequently further requires the drilling or replacing of wheel assembly components in order to mount the complex lighting and power systems.

There is therefore a need for a stationary or non-rotating automotive wheel lighting device that is quickly and easily installed in an automobile without the requirement of extensive equipment modifications. The present invention addresses such a need.

SUMMARY OF THE INVENTION

The present invention relates to a method and apparatus for providing decorative illumination to an automobile wheel having an apertured wheel covering. The apparatus includes a bracket adapted to be mounted to an automobile wheel caliper and at least one light emitting diode mounted on the bracket. The light emitting diode is powered by a battery. When energized, the light emitting diode is adapted to shine light intermittently through the apertured wheel covering when the wheel covering is rotating.

One object of the present invention is to provide an improved decorative illumination for an automobile. Related objects and advantages of the present invention will be apparent from the following description.

DESCRIPTION OF THE PREFERRED EMBODIMENTS

Figure 1A:
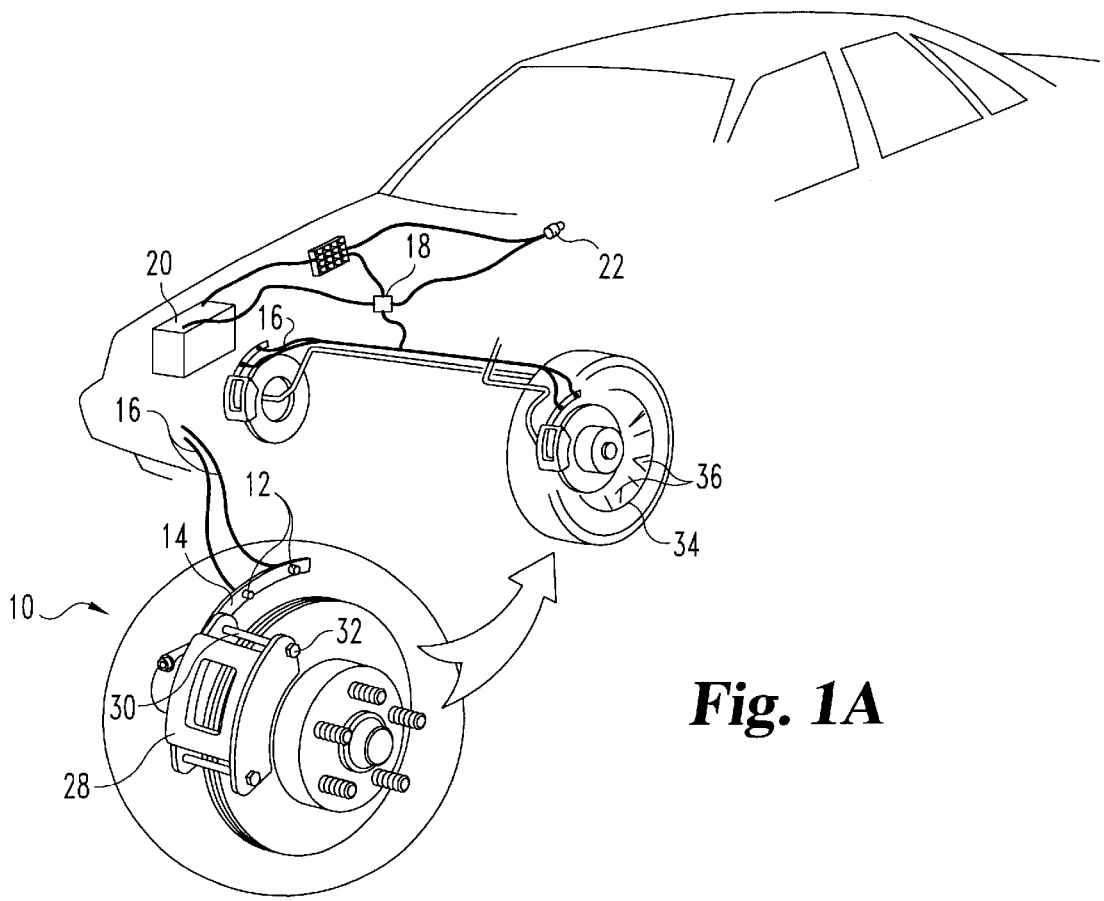
FIG. 1A is a partial, perspective cutaway view of a first embodiment of the present invention, an automobile wheel lighting assembly connected to an automobile wheel and power source.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1B:
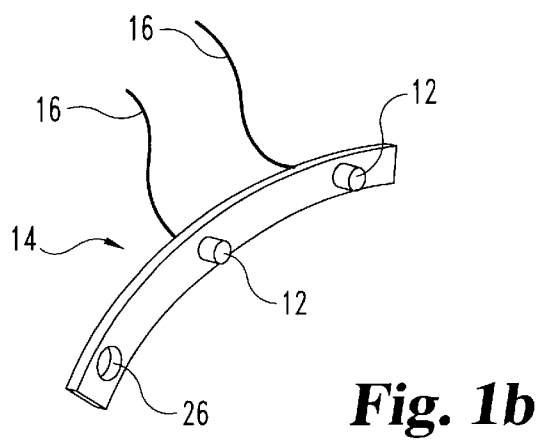
FIG. 1B is an enlarged perspective view of the bracket of FIG. 1A.

FIG. 1A illustrates a first embodiment of the present invention, a wheel lighting assembly 10 having one or more light sources 12 attached to a bracket 14. Electrically conducting wires 16 connect the light sources 12 to any convenient power source. As shown in FIG. 1, wire 16 connects to an automobile transfer box 18 which is in turn connected to a battery 20. An actuator switch 22 is electrically connected to the transfer box 18 and can be used to actuate the flow of power from the battery 20 to the light sources 12. The actuator switch 22 may be a headlight activation control, or the actuator switch may be an independently dedicated actuator switch.

The bracket 14, as shown in detail in FIB. 1B, preferably includes a mounting aperture 26 formed therethrough. The bracket 14 may be attached to a brake caliper 28 by passing the caliper bolt 30 through the mounting aperture 26 and securing the mounting aperture 26 to the caliper 28 with a fastener 32. The bracket 14 is preferably a linear or arcuate member but may be a circular member. More preferably, the bracket 14 is connected to the brake caliper 28 such that it extends from the [bake]brake caliper 28 to position the light sources 12 behind an apertured portion of a wheel cover. The positioning of the bracket 14 may be varied by pivoting the bracket 14 relative the brake caliper 28, thereby adjusting the positioning of the light sources 12. When so positioned on the brake caliper 28, the wheel light assembly 10, when actuated, shines light from light sources 12 through a partially transparent wheel cover 34, such as through apertures 36 formed through wheel cover 34.

Light sources 12 are preferably high intensity light emitting diodes (LEDs), although any convenient light sources may be chosen. The LEDs 12 are preferably connected to the power source 20 in parallel, such that the failure of one LED 12 does not result in the failure of the entire wheel light assembly 10.

The transfer box 18 preferably includes a relay adapted to receive a control signal from actuator switch 22. Light source 12 has a first state ("on" or "shining") and a second state ("off" or "not shining"). Receipt of the control signal by the relay preferably actuates a changing of the state of light source 12, such that receipt of the control signal either turns light source 12 on or off.

As discussed above, light source 12 is preferably one or more LEDs, and is more preferably an array of LEDs. Once actuated, light source 12 may shine continuously, or may flicker or strobe intermittently. If light source 12 is adapted to strobe, the strobing of light source 12 is more preferably timed such that each individual emitter of the light source 12 strobes when wheel cover aperture 36 is positioned substantially adjacent that respective emitter of the light source 12. Also, the light sources 12 may be made to pulse or flash even when the vehicle is stationary in order to maintain the lighting effect when parked or stopped. The mechanism for strobing the light source 12 is discussed in greater detail below.

Figure 2:
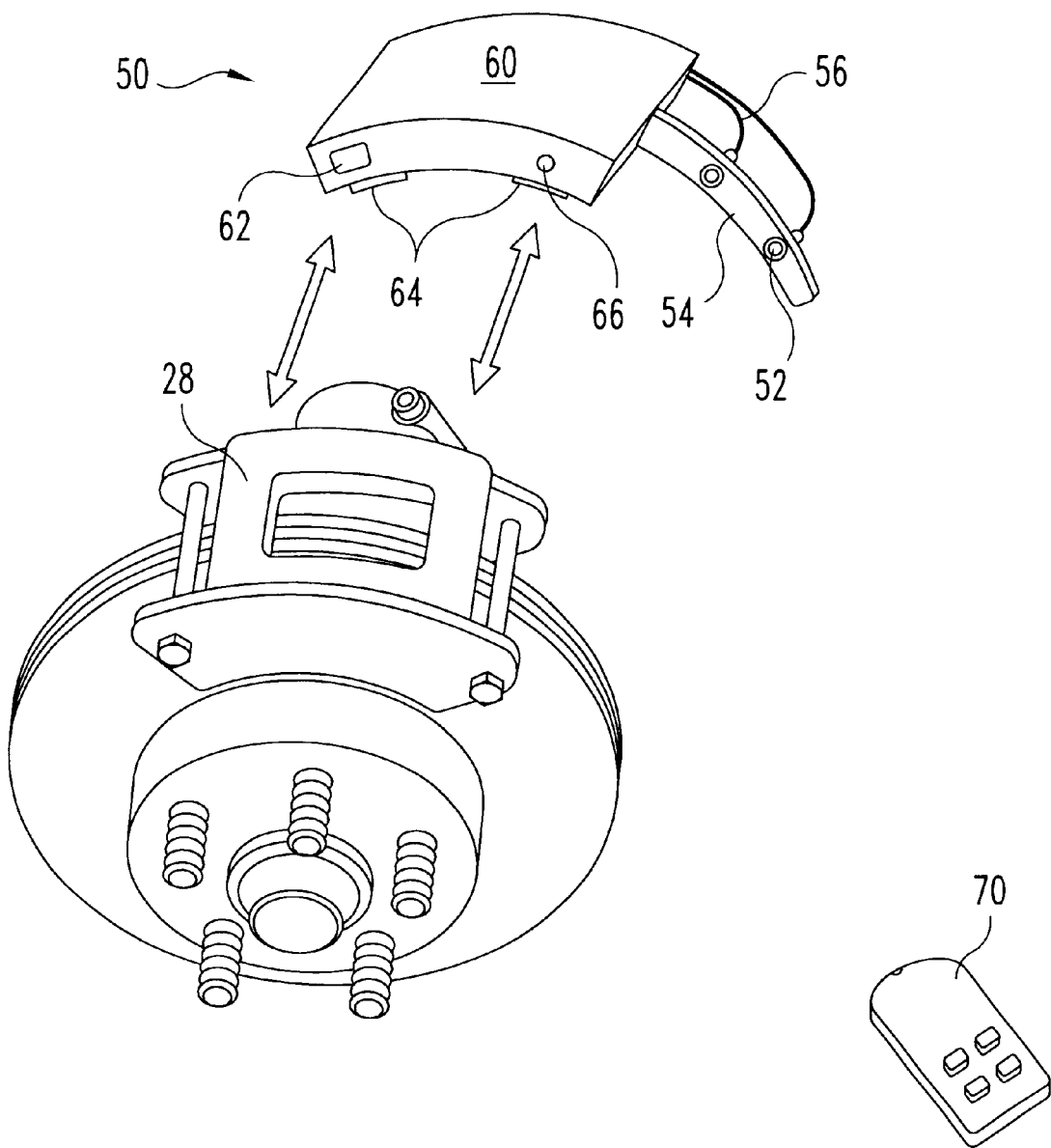
FIG. 2 is an exploded, perspective view of a second embodiment of the present invention, an automobile wheel lighting assembly magnetically connectable to an automobile wheel.

FIG. 2 illustrates a second embodiment of the present invention, a wheel lighting assembly 50 including one or more light sources 52 connected to a bracket 54. Wires 56 extend from light source 52 and connect in electrical communication to a power source 60. Power source 60 is preferably a rechargeable battery and is more preferably a designated battery exclusive to the assembly 50. A photoelectric device 62 is electrically connected to the battery 60, such that sunlight or other energetic light striking the solar cell 62 produces a recharging current to the battery 60. The solar cell 62 may be either integrally connected to the battery 60, or may be connected by wires such that the solar cell 62 may be conveniently positioned to receive sunlight. A magnet connector assembly 64 is connected to battery 60 such that battery 60 may be magnetically attached any ferromagnetic surface. A sensor 66 is connected to an activator circuit 68, and the activator circuit 68 is in turn connected between the battery 60 and the light source 52. The activator circuit 68 is adapted to receive a control signal from a remote control device 70.

Preferably, the wheel light assembly 50 is magnetically attached to a non-rotating ferromagnetic wheel surface, such as the brake caliper 28. More preferably, the contour of battery 60 and magnet assembly 64 are curved to match the contour of the surface of the brake caliper 28, to assure a secure fit between wheel light assembly 50 and brake caliper 28.

Preferably, the light source 52 is an LED. More preferably, the light source 52 is an array of LEDs. Also preferably, the sensor 66 is adapted to receive a radio control signal from the remote control 70; also preferably, remote control 70 is adapted to transmit a radio signal, although the remote control 70 and the sensor 66 may likewise be adapted to respectively send and receive any convenient type of control signal, such as ultrasonic, infrared, or the like, and may even be physically connected, such as by a fiber-optic cable or a wire. Alternately, activator mechanism 68 and sensor 66 may be adapted to actuate the light sources 52 in the presence of other stimulus, such as a decrease of the ambient light level below a certain predetermined threshold (for example, if the sensor 66 were a photoelectric cell adapted to actuate the light sources at night 52) and/or rotation of the automobile wheels (for example, if the sensor 66 were a motion sensor adapted to actuate the light sources 52 when the wheels are rotating). Additionally, the sensor 66 may be adapted to measure the rate of revolution of the wheel in order to vary strobing of the lights sources 52 with the wheel revolution rate as described elsewhere herein. It should be noted that the sensor 66 described above regarding the embodiment of FIG. 2 may also be used with the embodiment of FIG. 1 or any other embodiment of the present invention.

The power source 60 is preferably a battery of the rechargeable variety, such as nickel cadmium alloy or the like. Alternately, the power source 60 may be an alternate DC power source, such as a magnetic induction electrical generator of the type using a stationary magnet and a moving magnet repeatedly passing close to the stationary magnet to induce electrical current in a coil or wire. In such a system, the power source 60 would comprise a stationary magnet attached to bracket 54 and positioned such that a second, rotating magnet attached to the wheel or wheel cover would periodically move past the stationary magnet to induce current flow in a wire or coil attached thereto. Likewise, such a magnetic conductance assembly may replace the solar cell 62 as the recharging means to recharge the stationary battery 60.

Figure 3:
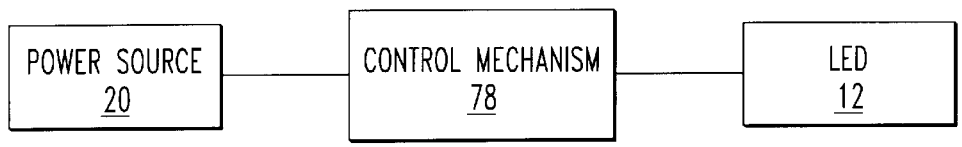
FIG. 3 is a schematic diagram of a light color control mechanism for use with the present invention.

As noted above, the light sources 12, 52 are preferably LEDs. As is shown in FIG. 3, the LEDs 12 (illustrated for convenience showing the LED 12 from the first above-described embodiment; it should be understood that this discussion is equally applicable with any embodiment of the present invention) may be of the multicolor variety having all three primary colors as separate channels in a single package (i.e., triluminary LEDs). Any desired color output may then be obtained by suitably choosing the current to each of the LED channels such that the LED 12 provides the admixture of primary colors appropriate to produce the perception of the desired output color. In other words, by varying these intensities individually any color in the rainbow may be produced. A control mechanism 78 is connected between the LED 12 and the battery or power source 20. The control mechanism 78 could be a variable output control, such as a dial (allowing a color selection to be made that remains static in time until changed), a microprocessor (allowing the perceived output color to change in time according to any preprogrammed scheme) or the like. The control mechanism 78 may have a direct user interface (i.e., be positioned in the vehicle to be directly user accessible), have a remote user interface (i.e., be in remote communication with the user via a remote control), or both.

Figure 4:
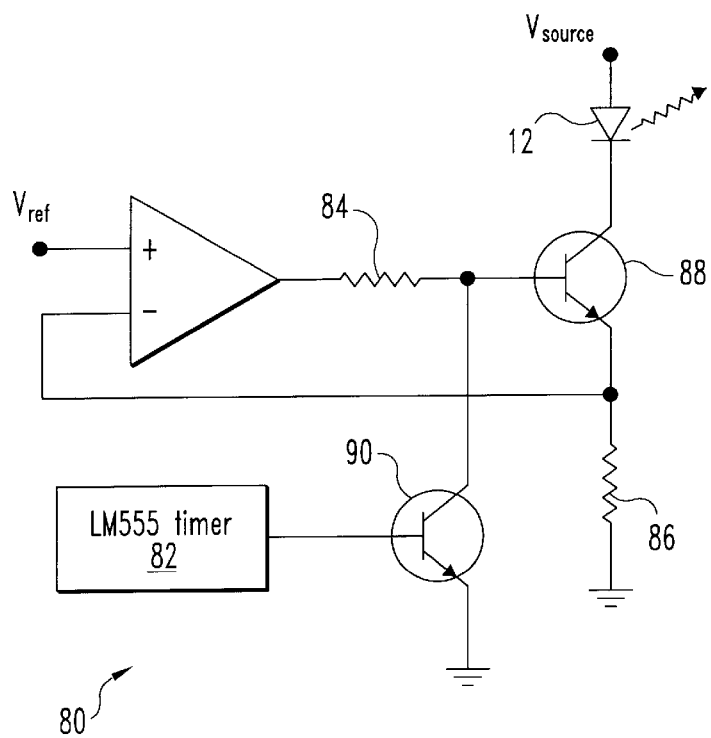
FIG. 4 is a schematic diagram of a light output pulsator circuit for use with the present invention.
Figure 5:
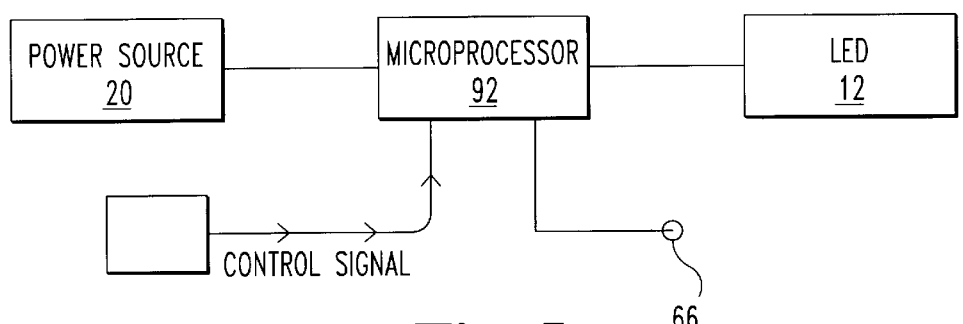
FIG. 5 is a schematic diagram of a light output timer mechanism for use with the present invention.

Light emitting diodes also respond rapidly to changes in current. This characteristic allows them to be pulsed at high speed. A variety of interesting optical phenomena result from viewing rotating objects with pulsed light. In particular, if the lights flash in synchrony with the rotation, the rotating object will appear motionless. If the flashing is slightly faster than the rotation then the object appears to rotate slowly backwards. This principle may be applied to the present invention by using a sensor 66 to measure the rotation rate of the wheels in order to vary the pulsation rate of the light sources 12, 52 as desired. By connecting a very simple electronic circuit to the LEDs 12, 52, the light output therefrom can made to flash in a rapid manner, producing aesthetically pleasing visual effects, including the above described stroboscopic effect on the wheels. One possible circuit 80 is shown in FIG. 4 (illustrated for convenience showing the LED 12 from the first above-described embodiment; it should be understood that the circuit 80 is equally functional with any embodiment of the present invention). The output from a standard integrated circuit timer (LM555) 82 is used to interrupt the regulated current supplied to the light emitting diode 12. The values of the resistors 84, 86 in this particular circuit are to be chosen to supply the desired current to the particular LED 12 without allowing any transistor 88, 90 into a saturated (fully turned on) state. This will mitigate Miller capacitance effects and provide faster switching. The circuit 80 shown is capable of switching at speeds faster than about 10 kHz, which is more than sufficient for this application. Alternately, a microprocessor 92 (see FIG. 5) may be used in place of the simple timer to allow any preprogrammed series of pulses to be produced. The microprocessor may receive input from the rotation sensor 66 in order to vary the pulsation rate of the light sources 12 as desired.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An assembly for providing illumination to an automobile wheel having an apertured wheel covering, comprising:
    a bracket adapted to be pivotably mounted to an automobile brake caliper;
    a light source mounted on the bracket; and
    a mounting magnet connected to the bracket;
    wherein the light source is adapted to be electrically connected to a battery;
    wherein the light source is adapted to shine light intermittently through the apertured wheel covering when the wheel covering is rotating; and
    wherein the mounting magnet is sufficiently powerful to connect the bracket to the brake caliper.

2. The assembly of claim 1 wherein the battery is an automobile battery.

3. The assembly of claim 1 wherein the battery is a designated rechargeable battery connected to the bracket and operationally connected to the light source.

4. The assembly of claim 3 further comprising a solar cell positioned to at least intermittently receive sunlight and electrically connected to the designated rechargeable battery.

5. The assembly of claim 3 further comprising a relay adapted to receive a control signal and operationally connected to the battery and the light source, and a control mechanism adapted to send a control signal to the relay, wherein the light source has a first shining state and a second non-shining state and wherein receipt of the control signal by the relay actuates a changing of the state of the light source.

6. The assembly of claim 5 wherein the control mechanism is a radio transmitter.

7. The assembly of claim 5 wherein the control mechanism is an automobile headlight activation control.

8. An assembly for providing illumination to an automobile wheel having an apertured wheel covering, comprising:
    a bracket adapted to be pivotably mounted to an automobile brake caliper; and
    a light source mounted on the bracket;
    wherein the light source is adapted to be electrically connected to a battery;
    wherein the light source is adapted to shine light intermittently through the apertured wheel covering when the wheel covering is rotating;
    wherein the light source is at least one light emitting diode; and
    wherein the at least one light emitting diode is a triluminary light emitting diode.

9. The assembly of claim 8 further comprising a control circuit connected between the triluminary light emitting diode and the battery, wherein the triluminary light emitting diode may be actuated to provide any desired perceived color.

10. The assembly of claim 8 further comprising a timer mechanism connected between the at least one light emitting diode and the battery, wherein the timer mechanism is operable to flash the at least one light emitting diode.

11. An assembly for providing illumination to an automobile wheel having an at least partially transparent wheel covering, comprising:
    a substantially linear bracket secured to a non-rotating portion of an automobile wheel;
    a light emitting diode operationally connected to the bracket; and
    a power source electrically connected to the light emitting diode;
    wherein the light emitting diode is adapted to shine light through the at least partially transparent wheel covering when the wheel covering is rotating;
    wherein the bracket is positioned to extend away from the brake caliper;
    wherein the positioning of the bracket may be varied by pivoting the bracket relative the brake caliper; and
    wherein the bracket is magnetically secured to the non-rotating portion of the automobile.

12. The assembly of claim 11 wherein the power source is an automobile battery.

13. The assembly of claim 11 wherein the power source is an automobile electrical system.

14. The assembly of claim 11 wherein the power source is a designated rechargeable battery.

15. The assembly of claim 14 further comprising a solar panel electrically connected to the rechargeable battery and positioned to at least intermittently receive sunlight.

16. The assembly of claim 11 further comprising a relay adapted to receive a control signal and operationally connected to the rechargeable battery and the light emitting diode, and a control mechanism adapted to send a control signal to the relay, wherein the light emitting diode has a first light emitting state and a second non-light emitting state and wherein receipt of the control signal by the relay actuates a changing of the state of the light emitting diode.

17. The assembly of claim 11 further comprising a timer mechanism connected between the light emitting diode and the power source, wherein the timer mechanism is operable to flash the light emitting diode.

18. A method for illuminating an automobile wheel having an at least partially transparent wheel cover, comprising the steps of:

a) magnetically attaching an array of light emitting diodes to a non-rotating portion of an automobile wheel;

b) remotely actuating a power source to energize the array of light emitting diodes; and c) shining light from the array of light emitting diodes through the at least partially transparent wheel cover as the at least partially transparent wheel cover rotates relative to the illumination source.

19. An assembly for illuminating to an automobile wheel having an at least partially transparent wheel covering, comprising:

a bracket secured to an automobile wheel brake caliper;

a light emitting diode array connected to the bracket; and a power source electrically connected to the light emitting diode array;

wherein the light emitting diode is positioned to intermittently shine light through the at least partially transparent wheel covering; and wherein the bracket is pivotable relative the automobile brake caliper.

20. The assembly of claim 19 wherein the bracket is mechanically secured to the brake caliper.

21. The assembly of claim 19 wherein the bracket is magnetically secured to the brake caliper.

22. The assembly of claim 19 wherein the power source is an automobile battery.

23. The assembly of claim 19 wherein the power source is an automobile electrical system.

24. The assembly of claim 19 wherein the bracket is substantially linear.

25. The assembly of claim 19 further comprising a relay adapted to receive a control signal and operationally connected to the power source and to the light emitting diode array, and a control mechanism adapted to send a control signal to the relay, wherein the light emitting diode array has a first light emitting state and a second non-light emitting state and wherein receipt of the control signal by the relay actuates a changing of the state of the light emitting diode array.

26. The assembly of claim 19 wherein the light emitting diode array is an array of triluminary diodes.

27. The assembly of claim 20 further comprising a control mechanism connected between the light emitting diode array and the power source, wherein the light emitting diode array may be actuated to provide any desired perceived color.

28. The assembly of claim 27 wherein the control mechanism is remotely actuated.

29. The assembly of claim 19 wherein the at least partially transparent wheel covering is stationary.

30. The assembly of claim 19 further comprising a timer mechanism connected between the light emitting diode array and the power source, wherein the timer mechanism is operable to flash the light emitting diode array at a predetermined pulsation rate.

31. The assembly of claim 30 wherein the timer mechanism is a microprocessor.

32. The assembly of claim 31 further comprising a rotation sensor operationally connected to the microprocessor and adapted to measure the rotation rate of the at least partially transparent wheel cover, wherein the microprocessor varies the pulsation rate as a function of the rotation rate.

* * * * *